(12) United States Patent
Cross et al.

(10) Patent No.: US 7,346,400 B2
(45) Date of Patent: Mar. 18, 2008

(54) POSITION-BASED ON/OFF SWITCH SCOPE

(75) Inventors: Bill Cross, Overland Park, KS (US);
Chris Lalik, Overland Park, KS (US);
Scott Nyhart, Shawnee, KS (US)

(73) Assignee: Bushnell Inc., Overland Park, KS (US)

( * ) Notice: Subject to any disclaimer, the term of this patent is extended or adjusted under 35 U.S.C. 154(b) by 296 days.

(21) Appl. No.: 11/190,244

(22) Filed: Jul. 27, 2005

(65) Prior Publication Data

US 2007/0032885 A1 Feb. 8, 2007

(51) Int. Cl.
*G05B 11/01* (2006.01)
*F41G 1/38* (2006.01)
*F41G 1/00* (2006.01)

(52) U.S. Cl. ............................ 700/13; 42/119; 42/120; 42/125; 42/127; 42/137

(58) Field of Classification Search ................... 700/13; 42/119, 125, 120, 127, 132, 137
See application file for complete search history.

(56) References Cited

U.S. PATENT DOCUMENTS

| 5,005,308 | A * | 4/1991 | Parks .......................... 42/122 |
| 6,978,569 | B2 * | 12/2005 | Williamson et al. .......... 42/132 |
| 2006/0101700 | A1 * | 5/2006 | Williamson et al. .......... 42/119 |

* cited by examiner

*Primary Examiner*—David Vincent
*Assistant Examiner*—Tom Stevens
(74) *Attorney, Agent, or Firm*—Hovey Williams LLP

(57) ABSTRACT

An optical scope with a position-based on/off switch preserves power by automatically deactivating one or more electrical components when the scope is not in use. The scope includes an orientation sensor that determines when the scope is in an inactive position by sensing when the scope is rolled left or right to a predetermined angle of inclination from an upright position. A power switch receives an indicia of orientation from the orientation sensor and deactivates the one or more electrical components when the scope is in the inactive position, thus preserving power and extending the life of a battery.

22 Claims, 4 Drawing Sheets

POSITION-BASED ON/OFF SWITCH SCOPE

BACKGROUND OF THE INVENTION

1. Field of the Invention

The present invention relates to optical scopes. More particularly, the invention involves a riflescope that preserves power by automatically deactivating electrical components when the scope is not in use.

2. Description of the Prior Art

Modern riflescopes often include electrical components to enhance the riflescopes ability to indicate a bullet's point of impact, to make the point of impact and the surrounding area appear closer to the user, and to make firearms safer to use. An example of such an electrical component is the HOLOSIGHT™ manufactured by BUSHNELL PERFORMANCE OPTICS™. The HOLOSIGHT™ uses electrical components to project the appearance of an illuminated crosshair a predetermined distance in front of the firearm and has the advantage of, among other things, being a very fast sight. Other electrical components that may be used in riflescopes include reticle illumination circuits, rangefinders, and night vision accessories.

Unfortunately, such scopes often suffer from limitations associated with excessive power consumption, particularly if a single scope includes two or more electrical components. Because riflescopes typically must be small and lightweight to facilitate use with a firearm, the power source driving the electrical components must also be relatively small and lightweight. If a user leaves the electrical components activated during a hunt, the battery may be depleted in a matter of hours, particularly if the battery has been partially depleted through prior use.

One solution to this problem is to include a larger battery or multiple batteries, but this solution is often unacceptable because it requires more space within the scope and/or more weight on the scope. Another solution is for the user to carry extra batteries to replace depleted batteries, but this solution is also undesirable in that replacing the battery may interfere with use of the scope. Morever, the user may not discover that the scope battery needs to be replaced until the user spots an animal and attempts to aim the rifle at the animal, for example, at which time replacing the battery may delay the shot until the animal has disappeared.

Accordingly, there is a need for an improved riflescope that does not suffer from the problems and limitations of the prior art.

SUMMARY OF THE INVENTION

The present invention solves the above-described problems and provides a distinct advance in the art of riflescopes. More particularly, the present invention involves a riflescope with at least one electrical component, wherein the component is automatically activated when the scope is in an active position, and is automatically deactivated when the scope is in an inactive position, thereby preserving power when the riflescope is not in use.

According to a first embodiment, the invention involves an apparatus for deactivating an electrical component of an optical scope. The apparatus comprises an orientation sensor for detecting when the scope is in an inactive position, and a power switch in communication with the orientation sensor for deactivating the electrical component when the scope is in the inactive position.

In a second embodiment, the apparatus further implements a delay period between detecting that the scope is in the inactive position and deactivating the electrical component. The apparatus of the second embodiment comprises the orientation sensor for detecting when the scope is in an inactive position, wherein the scope is in the inactive position when it is rolled beyond a predetermined angle of inclination from an upright position. A delay circuit receives a signal from the orientation sensor indicating that the scope is in the inactive position and determines how long the scope is in the inactive position.

A controller deactivates the electrical component when the delay circuit indicates that the scope has been in the inactive position for a predetermined length of time, and a user input enables a user to selectively determine the angle of inclination and the delay period.

In a third embodiment, the apparatus is further operable to deactivate a plurality of electrical components after a maximum activation period. The apparatus of the third embodiment includes the orientation sensor for detecting when the scope is in an inactive position, wherein the scope is in the inactive position when it is rolled beyond a predetermined left angle of inclination from an upright position and when it is rolled beyond a predetermined right angle of inclination from an upright position. A delay circuit is in communication with the orientation sensor and indicates when the scope has been in the inactive position for a predetermined delay period.

A timer circuit indicates when the electrical components have been activated for a predetermined maximum activation period. The controller deactivates the electrical components when the delay circuit indicates that the scope has been in the inactive position for the delay period, and deactivates the electrical components when the timer circuit indicates that the electrical components have been activated for the maximum activation period. A user input enables a user to determine the delay period and the activation period.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
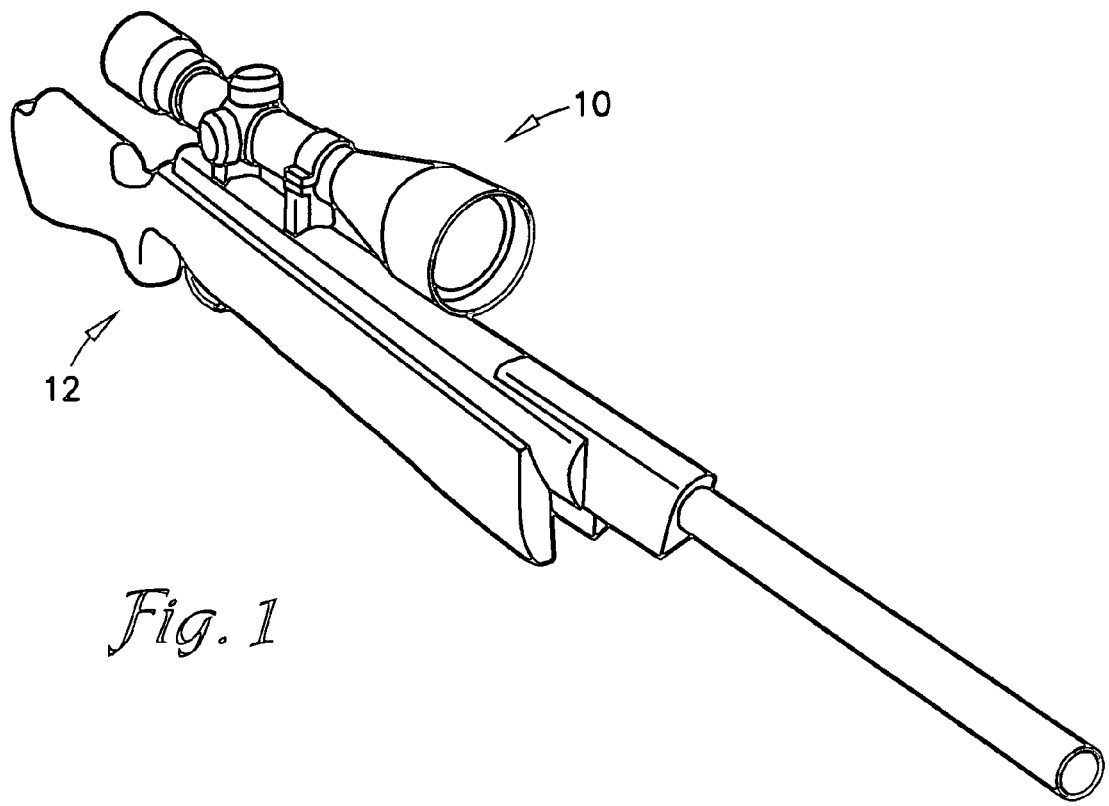
FIG. 1 is a perspective view of a riflescope constructed according to principles of the present invention, wherein the riflescope is shown mounted on a rifle.
Figure 2:
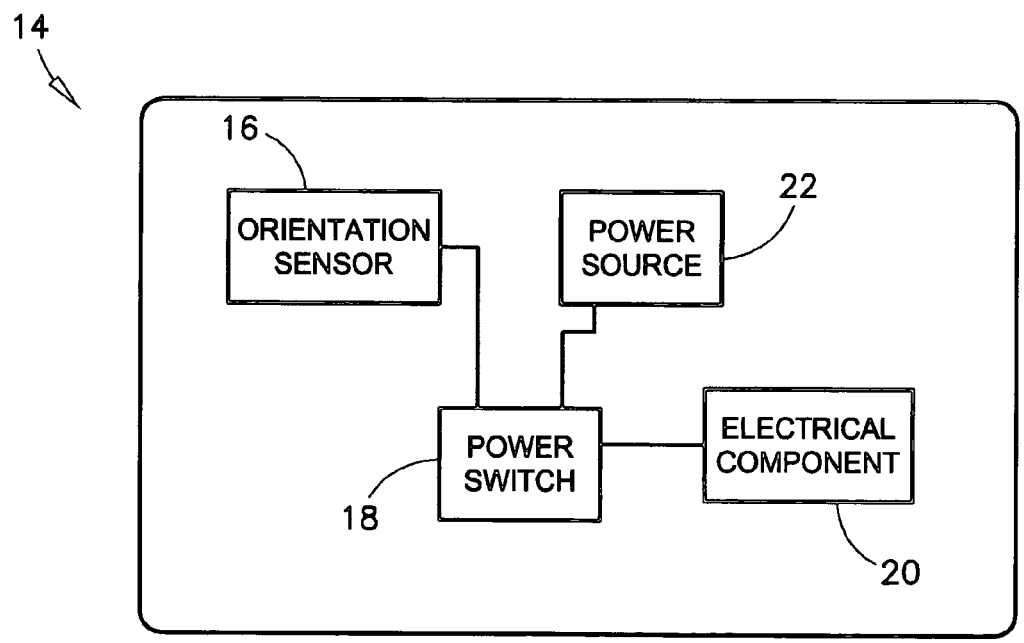
FIG. 2 is a block diagram of an electric circuit of the riflescope of FIG. 1 constructed according to a first embodiment of the invention.

Referring initially to FIGS. 1 and 2, an exemplary riflescope employing the principles of the present invention is shown mounted on a rifle 12 and designated generally by the reference numeral 10. The riflescope 10 includes an electric circuit 14 that generally comprises an orientation sensor 16, a power switch 18, an electrical component 20, and a power source 22. While the riflescope 12 is illustrated mounted on the rifle 12, the term "riflescope" as used herein refers to a broad range of optical scopes used with firearms of various types including, for example, rifles, shotguns and pistols.

The orientation sensor 16 generally determines an orientation of the riflescope 10 and communicates indicia of the orientation to the power switch 18. The illustrated orientation sensor 16 preferably includes a tilt sensor of a type that is generally known in the art, such as a pendulum, mercury, electrolytic, or other type of single or dual axis tilt sensor that responds to a change in the sensor's 16 orientation. The orientation sensor 16 communicates indicia of the orientation via an electrical signal to the power switch circuit 18. The orientation sensor 16 may communicate, for example, a signal that indicates a current angle of inclination from an upright position each time a position of the orientation sensor 16 is changed. Alternatively, the orientation sensor 16 may simply communicate a first electrical signal corresponding to zero volts when the sensor is in a substantially upright position, and a second electrical signal corresponding to five volts when the sensor 16 is at a predetermined angle of inclination from the upright position.

Figure 5:
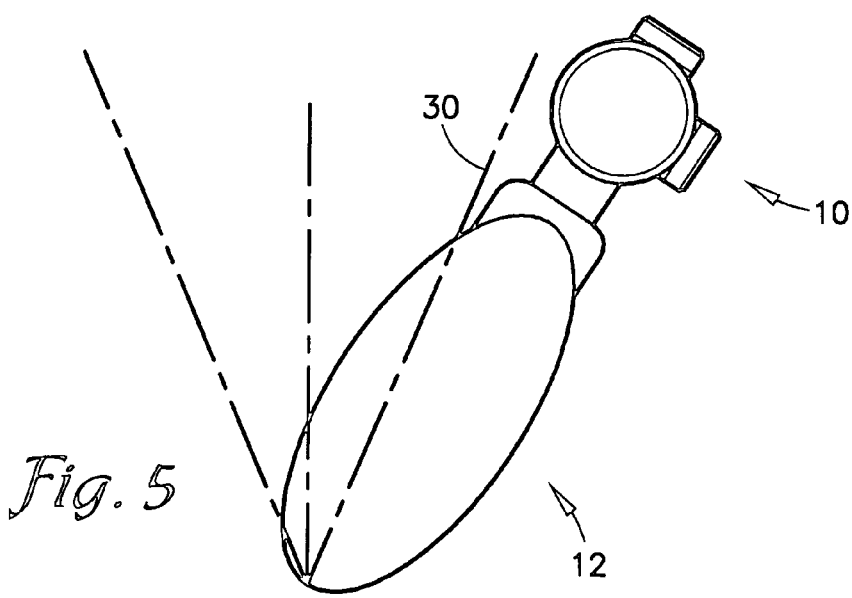
FIG. 5 is a rear elevation view of the riflescope and rifle of FIG. 1, wherein the rifle is shown in a first inactive position wherein the electrical component is deactivated and the reticle is not visible in the viewfinder.
Figures 6, 7, 8:
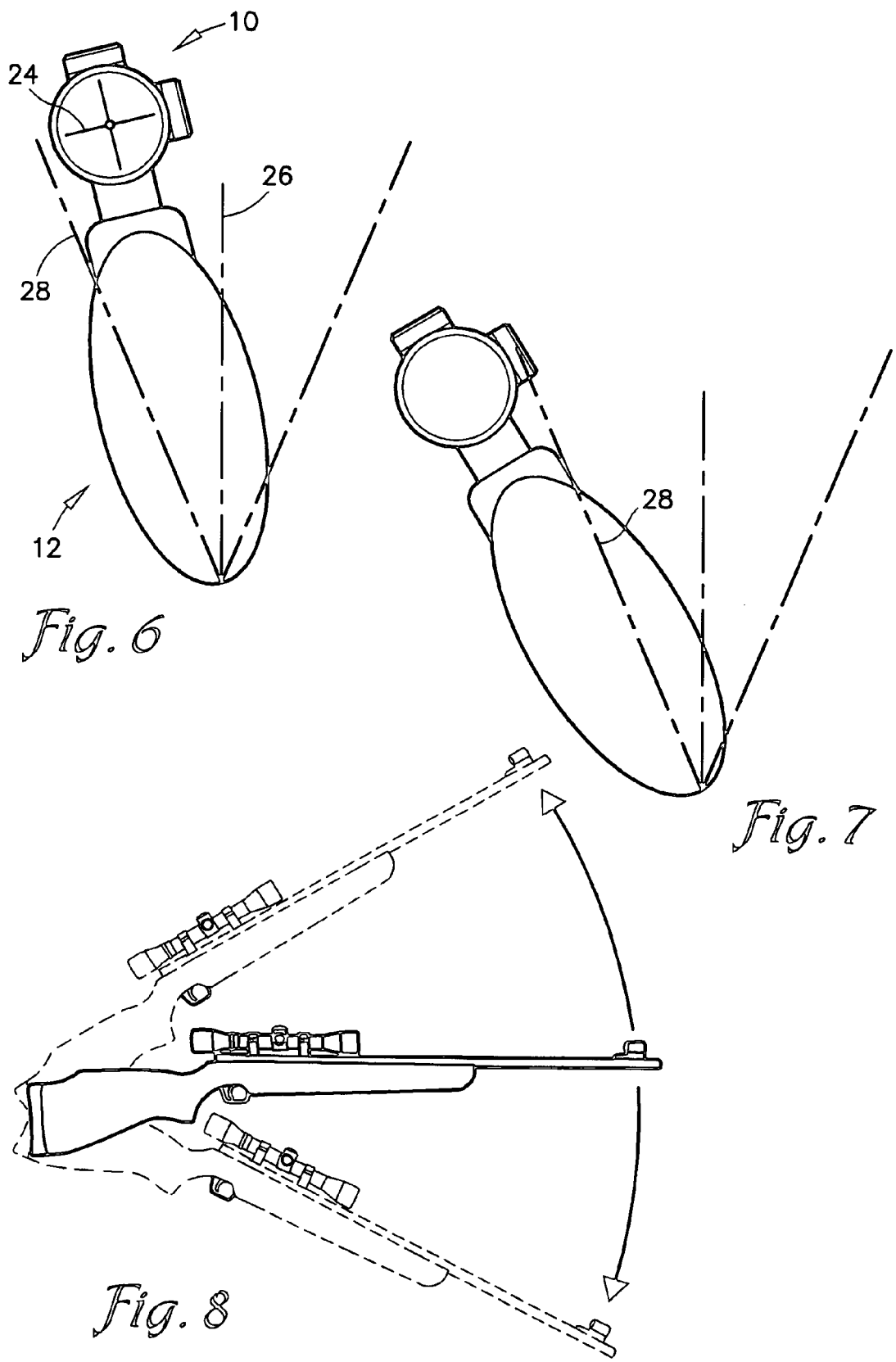
FIG. 6 is a rear elevation view of the riflescope and rifle of FIG. 1, wherein the rifle is shown in a third active position wherein the electrical component is activated and causes the reticle to appear in a viewfinder of the riflescope.
FIG. 7 is a rear elevation view of the riflescope and rifle of FIG. 1, wherein the rifle is shown in a second inactive position wherein the electrical component is deactivated and the reticle is not visible in the viewfinder.
FIG. 8 is a side elevation view of the riflescope and rifle of FIG. 1 illustrating the gun at various pitches.

Thus, the orientation sensor 16 determines when the riflescope 10 is in an active position and when it is in an inactive position. As explained below in greater detail, the riflescope 10 is in an "active" position when it is at or near a substantially upright position, and it is in an "inactive" position when it is rolled beyond a predetermined angle of inclination from the upright position. As used herein, the "roll" of the rifle is the degree to which the rifle is tilted to one side or the other, as illustrated in FIGS. 3-7, and should be distinguished from a change in a pitch of the rifle, as illustrated in FIG. 8.

The power switch 18 generally activates and deactivates the electrical component 20 in response to the indicia of orientation communicated by the orientation sensor 16. The power switch 18 is in electrical communication with the power source 22 and the electrical component 20, and activates the electrical component 20 by selectively communicating power from the power source 22 to the component 20. More particularly, the power switch 18 receives the electrical signal from the orientation sensor 16, communicates power from the power source 22 to the electrical component 20 if the signal indicates that the riflescope 10 is in an active position, and isolates the electrical component 20 from the power source 22 if the signal indicates that the riflescope 10 is in an inactive position. The power switch 18 is thus responsive to electrical signals and may include, for example, a transistor, a relay, and/or another electronic component responsive to an electrical signal.

The electrical component 20 is associated with use of the riflescope 10 and is energized by the power source 22. The electrical component 20 may be internal or external to the riflescope 10 and may include, for example, a reticle illumination circuit or a reticle activation circuit, such as a circuit that activates a holographic or other electronically-generated reticle. It will be appreciated that the electrical component 20 may be any of a variety of electrical devices or circuits that are used in or with a riflescope, such as a rangefinder or a night vision accessory.

The power source 22 energizes the electrical component 20 via the power switch 18, as explained above. The power source 22 is preferably a battery, fuel cell, or other self-contained, portable source that may be used in the riflescope 10 without excessively increasing the size or weight of the riflescope 10. Although the power source 22 has been described as energizing the electrical component 20, it will be appreciated that the power source 22 may also energize the orientation sensor 16, the power switch 18, or both.

Figure 3:
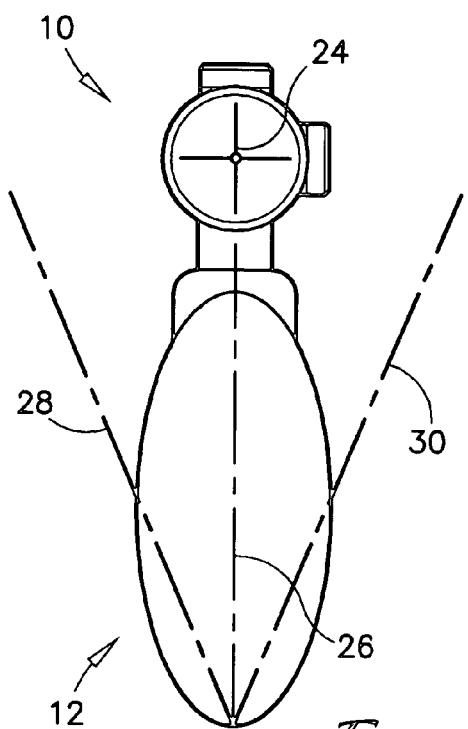
FIG. 3 is a rear elevation view of the riflescope and rifle of FIG. 1, wherein the rifle is shown in a first active position wherein an electrical component is activated and causes a reticle to appear in a viewfinder of the riflescope.

In use, the orientation sensor 16 causes the power switch 18 to activate the electrical component 20 when the rifle 12 is in an active position, and to deactivate the electrical component 20 when the rifle 12 is in an inactive position. Referring particularly to FIGS. 3-7, the orientation sensor 16 and power switch 18 activate the electrical component 20 only when the rifle 12 is in a substantially upright position. In FIG. 3, for example, the riflescope 10 and rifle 12 are shown in a first active position, wherein the riflescope 12 is aligned with a substantially vertical line 26. In the upright position the electrical component 20 is activated and generates the reticle 24 visible within a field of view of riflescope 10. The vertical line 26 illustrates a purely vertical orientation and a center of an active region, wherein a left activation threshold line 28 and a right activation threshold line 30 each indicate an outer boundary of the active region. If the riflescope 10 is aligned with either of the activation threshold lines 28,30, or any position therebetween, the rifle 12 is in an active position and the electrical component 20 is activated. Similarly, if the rifle 12 is rolled beyond either of the activation threshold lines 28,30, the riflescope 10 is in an inactive position and the power switch 18 deactivates the electrical component 20.

Figure 4:
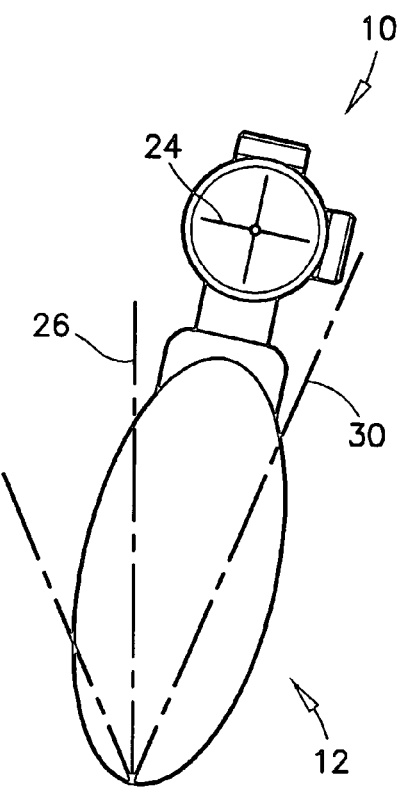
FIG. 4 is a rear elevation view of the riflescope and rifle of FIG. 1, wherein the rifle is shown in a second active position wherein the electrical component is activated and causes the reticle to appear in a viewfinder of the riflescope.

FIG. 4, for example, illustrates the rifle 12 rolled somewhat to the right of vertical, but still between the vertical line 26 and the right activation threshold line 30. In this position, the rifle 12 is within the active region and the power switch 18 activates the electrical component 20, as indicated by the visible reticle 24. In FIG. 5 the rifle 12 is illustrated rolled beyond the right activation threshold line 30, and, thus, outside the active region. The rifle 12 is in an inactive position, and the power switch 18 has deactivated the electrical component 20 as indicated by the fact that no reticle is visible in the field of view of the riflescope 10. Similarly, FIGS. 6 and 7 illustrate the riflescope 10 rolling to the left, wherein the riflescope 10 is within the active region in FIG. 6 and has rolled outside the active region in FIG. 7.

The orientation sensor 16 and the power switch 18 are thus operable to deactivate the electrical component 20 when the rifle 12 is not in use and, therefore, preserve energy stored in the power source 22. When a hunter is stationary, for example, waiting for game to approach, he or she may hold the rifle 12 so that the rifle 12 is rolled to one side or the other beyond an activation threshold line 28,30, thus deactivating the electrical component 20 and preserving the life of the power source 22. As an animal approaches the hunter's position, the hunter simply rolls the rifle 12 into an upright position, causing the power switch 18 to activate the electrical component 20 in preparation for targeting the animal. It will be appreciated that in such a situation the hunter does not need to physically turn the switch 18 on and off, making use of the riflescope 12 more convenient and eliminating the risk of the hunter inadvertently leaving a power switch in an "on" position and reducing the life of the power source 22. Likewise, storing or carrying the rifle 12 on its side or upside down causes the electrical component 20 to remain deactivated.

It should be noted that in the above-described implementation, the orientation sensor 16 and the power switch 18 activate and deactivate the electrical component 20 according to a roll of the rifle 12. The electric circuit 14 generally is not responsive to a change in a pitch of the rifle 12, wherein a change in pitch is illustrated in FIG. 8. Changing an orientation of the rifle 12 as illustrated in FIG. 8, therefore, does not cause the electrical component 20 to be activated or deactivated. One of ordinary skill in the art will recognize, however, that in alternative implementations it may be desirable to configure the circuit 14 to deactivate the electrical component 20 according to the pitch of the rifle 12. The circuit 14 could be responsive to a pitch of the rifle 12 by including an orientation sensor that detects a change in the pitch of the rifle 12. Such an implementation may be desirable if, for example, the user desires the electrical component 20 to be deactivated when the rifle 12 is pointed towards the ground.

Figure 9:
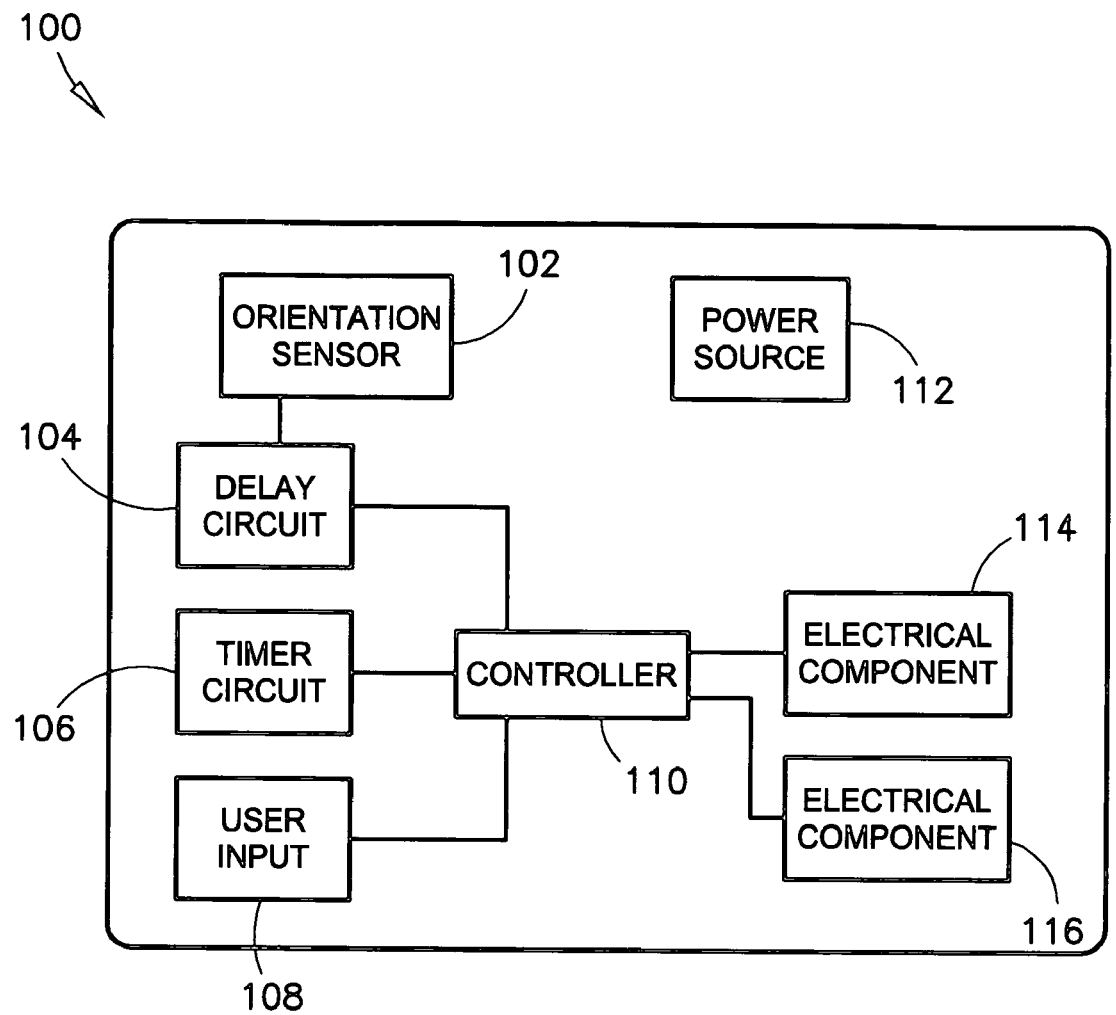
FIG. 9 is a block diagram of components of an electric circuit of the riflescope of FIG. 1 constructed according to a second embodiment of the invention.

A circuit constructed in accordance with principles of a second embodiment of the present invention is illustrated in FIG. 9 and designated generally by the reference numeral 100. The circuit 100 is similar in nature to the circuit 14 described above, but is user configurable and includes additional elements that add functionality to circuit 100. The circuit 100 comprises an orientation sensor 102, a delay circuit 104, a timer circuit 106, a user input 108, a controller 110, a power source 112, a first electrical component 114, and a second electrical component 116.

The orientation sensor 102 is similar to the orientation sensor 16 described above, except that the orientation sensor 102 communicates indicia of the orientation of the riflescope 12 to the delay circuit 104. Furthermore, the orientation circuit 102 includes a dual-axis tilt sensor to detect not only a roll of the riflescope 10, but also a pitch of the riflescope 10. As explained below, the orientation sensor 102 and the delay circuit 104 cooperate to signal the controller 110 to deactivate the electrical components 114,116 only if the riflescope 10 has been in an inactive position for more than a predetermined and continuous length of time.

The delay circuit 104 generally receives the indicia of orientation from the orientation sensor 102, monitors a length of time the riflescope 10 is in an inactive position, and causes the controller 110 to deactivate the electrical components 114,116 after the riflescope 10 has been in an inactive position for a continuous, predetermined length of time or "delay period." The delay circuit 104 thus prevents the controller 110 from deactivating the electrical components 114,116 in response to momentary deviations in the orientation of the riflescope 10 that are shorter than the delay period, such as may be caused, for example, by a recoil of the rifle 12 or an inadvertent shift of the rifle 12 in the user's hands. The illustrated delay circuit 104 preferably includes a counter or other digital timing circuit, an analog timing circuit such as an integrator, or both. Furthermore, while the delay circuit 104 is shown separate from the controller 110 and the orientation sensor 102, one skilled in the art will recognize that the delay circuit 104 may be integral with either the controller 110 or the orientation sensor. Finally, the delay period required to deactivate the electrical components 114,116 is preferably user specified via the user input 108, as explained below.

The timer circuit 106 generally monitors a length of time the electrical components 114,116 have been active and signals the controller 110 to deactivate the electrical components 114,116 if the activation period exceeds a predetermined and continuous length of time or "maximum activation period." If the timer circuit 106 detects that the electrical components 114,116 have been active for ten minutes, for example, the timer circuit 106 signals the controller 110 to deactivate the electrical components 114, 116. The maximum activation period is selectably adjustable by the user via the user input 108, as explained below.

The user input 108 generally enables the user to configure the circuit 100 by communicating user-initiated control signals to the controller 110. The user input 108 preferably includes a number pad (not shown) and one or more function keys (not shown), but may take any form known in the art. The user input may include, for example, a key pad and/or a display portion such as a liquid crystal display (LCD). The user input 108 is preferably removably or permanently mounted on the riflescope 10 and connected to the controller 110 or other components via a wire. Alternatively, the user input 108 may be separate from the scope 12 and wirelessly communicate with the controller 110 or other components.

Via the user input 108, for example, a user may determine the delay period associated with the delay circuit 104 and the maximum activation period associated with the timer circuit 106. The user may set the delay period, for example, to one second, five seconds, ten seconds, or another length of time desired by the user. Alternatively, the delay period may be set to zero if the user desires no delay at all. Similarly, the maximum activation period may be set to five minutes, ten minutes, thirty minutes, or another length of time desired by the user. Alternatively, the user may disable the automatic deactivation function by configuring the controller 110 to ignore any signals received from the timer circuit 106, or to deactivate the timer circuit 106 itself.

Through the user input 108, the user may configure the controller 110 to activate and deactivate both electrical components 114,116 simultaneously, or may configure the controller 110 to activate and deactivate each component 114,116 according to a different schedule. The user input may enable the user to determine a first delay period and a first maximum activation period associated with the first electrical component 114, and to determine a second delay period and a second maximum activation period associated with the second electrical component 116. The user may desire, for example, that the first electrical component 114 always be activated while the second electrical component 116 be activated and deactivated in response to the signals from the delay circuit 104 and the timercircuit 106. In that case the user configures the controller 110 to maintain the first electrical component 114 in an activated state, and to maintain the second electrical component 116 in an activated state or a deactivated state according the signals communicated by the delay circuit 104 and the timer circuit 106.

Alternatively, the user may desire that the first electrical component 114 be activated and deactivated only in response to signals communicated from the delay circuit 104, and desire that the second electrical component 116 be activated and deactivated in response to both the delay circuit 104 and the timer circuit 106. This may be the case, for example, where the first electrical component 114 includes a reticle enabling circuit and the second electrical component 116 includes a rangefinder. The rangefinder may be safely disabled after an initial period in which the user acquires the necessary distance information from the rangefinder, while the reticle needs to remain enabled to allow the user to quickly aim the rifle 12 at an animal.

The user may also determine positions of the threshold activation lines 28,30 via the user input 108 and the controller 110. The controller 110 may store values representing angles of inclination of each of the threshold activation lines 28,30 from the vertical line 26, for example, wherein the user may adjust the values. The user may desire to reduce the left angle of inclination to five degrees, for example, and increase the right angle of inclination to forty-five degrees. One skilled in the art will readily recognize that the controller 110 may be configured via the user input 108 to perform any combination of functions in response to various input signals from components of the circuit 100. Furthermore, the circuit 100 may include any number of electrical components in addition to the illustrated components 114, 116 that are regulated by the controller 110, wherein the controller 110 may be configured via the user input 108 to separately control each electrical component according to user-defined parameters.

The controller 110 generally activates and deactivates the electrical components 114,116 in response to signals received from various other components of the circuit 100. The controller 110 includes a digital logic circuit and may be custom designed for use in the circuit 100, such as an application specific integrated circuit (ASIC), or may be a general use, off-the-shelf digital processor. Furthermore, the controller 110 may be programmable and operate according to a set of instructions submitted from an outside device, or may operate according to a set of firmware instructions. The controller 110 thus preferably includes one or more internal memory elements for storing instructions and data. As explained above, the controller 110 regulates one or both of the electrical components 114,116 in response to the signals received from the delay circuit 104, the timer circuit 106, and the user input 108, wherein the controller 110 both activates and deactivates the electrical components 114,116 in response to the signals.

The power source 112 is substantially identical to the power source 22 described above. Although lines are not included in FIG. 9 representing connections between the power source 112 and the other components, it will be appreciated that the power source 112 energizes the various other components of the circuit 100 in a traditional manner. Furthermore, via the user input a user may disconnect or isolate the power source 112 from one or more of the electrical components of the circuit 100. If the user desires to deactivate the entire circuit 100, for example, he or she may disconnect the power source 112 from all other components. Alternatively, if the user desires to deactivate the first electrical component 114, he or she may disconnect the power source 112 from the first electrical component 114 while leaving the power source 112 connected to the other components of the circuit 100.

Each of the electrical components 114,116 is substantially identical to the electrical component 20, except that each electrical component 114,116 is separately controlled by the controller 110. The first electrical component 114 may include a reticle generation or illumination circuit, for example, while the second electrical component may include a range finder.

Although the invention has been described with reference to the preferred embodiments illustrated in the attached drawings, it is noted that equivalents may be employed and substitutions made herein without departing from the scope of the invention as recited in the claims. It will be appreciated, for example, that the principles of the present invention are not limited to use with riflescopes but may be employed in any of a variety of instruments used for viewing or observing including, for example, telescopes, binoculars, rangefinders, and spotting scopes.

Having thus described the preferred embodiment of the invention, what is claimed as new and desired to be protected by Letters Patent includes the following:

1. An apparatus for deactivating an electrical component of an optical scope, the apparatus comprising:
    an orientation sensor for detecting when the scope is in an inactive position; and
    a power switch in communication with the orientation sensor for deactivating the electrical component when the scope is in the inactive position,
    the electrical component being chosen from the group consisting of a reticle illumination circuit, a reticle activation circuit, a rangefinder, and a night vision accessory.

2. The apparatus as set forth in claim 1, further comprising a delay circuit for causing the power switch to deactivate the electrical component only after the scope has been in the inactive position for a predetermined length of time.

3. The apparatus as set forth in claim 2, further comprising a user input for enabling a user to determine the length of time.

4. The apparatus as set forth in claim 1, further comprising a timer circuit for causing the power switch to deactivate the component if the component has been activated for a predetermined length of time.

5. The apparatus as set forth in claim 4, further comprising a user input for enabling a user to determine the length of time.

6. The apparatus as set forth in claim 1, further comprising a user input for enabling a user to manually activate and deactivate the electrical component.

7. The apparatus as set forth in claim 1, wherein the scope is in the inactive position when the scope is rolled to a predetermined angle of inclination from an upright position.

8. The apparatus as set forth in claim 7, further comprising a user input for enabling a user to determine the angle of inclination.

9. The apparatus as set forth in claim 1, wherein the scope is in the inactive position when scope is rotated to a predetermined pitch from a horizontal position.

10. The apparatus as set forth in claim 9, further comprising a user input for enabling a user to determine the pitch.

11. The apparatus as set forth in claim 1, wherein the orientation sensor further detects when the scope is in an active position, and the power switch activates the electrical component when the scope is in the active position.

12. An apparatus for deactivating a plurality of an electrical components of an optical scope, the apparatus comprising:
    an orientation sensor for detecting when the scope is in an inactive position, wherein the scope is in the inactive position when it is rolled beyond a predetermined angle of inclination from an upright position;

a delay circuit for receiving a signal from the orientation sensor indicating that the scope is in the inactive position and for determining how long the scope is in the inactive position;

a controller for deactivating the plurality of electrical components when the delay circuit indicates that the scope has been in the inactive position for a predetermined length of time, each of the plurality of electrical components being chosen from the group consisting of a reticle illumination circuit, a reticle activation circuit, a rangefinder, and a night vision accessory; and a user input for enabling a user to selectively determine the angle of inclination and the delay period.

13. The optical scope as set forth in claim 12, wherein the scope is in the inactive position when it is rotated to a predetermined pitch from a horizontal position.

14. The optical scope as set forth in claim 13, wherein the user input enables a user to selectively determine the pitch.

15. The optical scope as set forth in claim 12, wherein the delay circuit further indicates that the scope is in an active position, and the controller further activates the plurality of electrical components when the delay circuit indicates that the scope is in the active position.

16. The optical scope as set forth in claim 12, wherein the orientation sensor further detects when the scope is in an active position, and the controller activates the plurality of electrical components when the scope is in the active position.

17. An apparatus for regulating a plurality of electrical components of an optical scope, the apparatus comprising:

an orientation sensor for detecting when the scope is in an inactive position, wherein the scope is in the inactive position when it is rolled beyond a predetermined left angle of inclination from an upright position and when it is rolled beyond a predetermined right angle of inclination from an upright position;

a delay circuit in communication with the orientation sensor for indicating when the scope has been in the inactive position for a predetermined delay period;

a timer circuit for indicating when at least one of the electrical components has been activated for a predetermined maximum activation period;

a controller for deactivating at least one of the electrical components when the delay circuit indicates that the scope has been in the inactive position for the delay period, and for deactivating an electrical component when the timer circuit indicates that the electrical component has been activated for the maximum activation period; and a user input for enabling a user to determine a first delay period and a first maximum activation period associated with a first electrical component, and to determine a second delay period and a second maximum activation period associated with a second electrical component.

18. The optical scope as set forth in claim 17, wherein the user input further enables the user to separately determine the left angle of inclination and the right angle of inclination.

19. The optical scope as set forth in claim 17, wherein the scope is in the inactive position when it is rotated to a predetermined pitch from a horizontal position.

20. The optical scope as set forth in claim 17, wherein the user input further enables a user to determine a first inactive position associated with a first electrical component and a second inactive position associated with a second electrical component.

21. The optical scope as set forth in claim 17, wherein the first electrical component and the second electrical component is chosen from the group consisting of a reticle illumination circuit, a reticle activation circuit, a rangefinder, and a night vision accessory.

22. The optical scope as set forth in claim 17, wherein the orientation sensor further detects when the scope is in an active position, and the controller activates at least one of the electrical components when the scope is in the active position.

* * * * *